United States Patent
Stephens et al.

(10) Patent No.: US 9,804,962 B2
(45) Date of Patent: Oct. 31, 2017

(54) GARBAGE COLLECTION CONTROL IN MANAGED CODE

(71) Applicant: Microsoft Technology Licensing, LLC, Redmond, WA (US)

(72) Inventors: Maoni Zhang Stephens, Krikland, WA (US); Patrick Henri Dussud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 14/622,196

(22) Filed: Feb. 13, 2015

(65) Prior Publication Data
US 2016/0239413 A1 Aug. 18, 2016

(51) Int. Cl.
  *G06F 17/30* (2006.01)
  *G06F 12/02* (2006.01)

(52) U.S. Cl.
  CPC ...... *G06F 12/0261* (2013.01); *G06F 12/0269* (2013.01); *G06F 2212/702* (2013.01)

(58) Field of Classification Search
  CPC .......................... G06F 12/0261; G06F 12/0269
  See application file for complete search history.

(56) References Cited

U.S. PATENT DOCUMENTS

| | | |
|---|---|---|
| 5,809,554 A | 9/1998 | Benayon et al. |
| 5,842,016 A * | 11/1998 | Toutonghi ............... G06F 9/52 707/999.202 |
| 5,933,840 A | 8/1999 | Menon et al. |
| 6,457,142 B1 | 9/2002 | Klemm et al. |
| 6,701,520 B1 | 3/2004 | Santosuosso et al. |
| 6,898,602 B2 | 5/2005 | Sayag |
| 7,114,045 B1 | 9/2006 | Pliss et al. |
| 7,484,067 B1 | 1/2009 | Bollella et al. |
| 7,774,389 B2 | 8/2010 | Stephens et al. |
| 8,347,061 B2 | 1/2013 | Varma et al. |
| 8,429,658 B2 | 4/2013 | Auerbach et al. |
| 8,825,721 B2 | 9/2014 | Hunt et al. |
| 2005/0149585 A1 | 7/2005 | Bacon et al. |
| 2007/0011415 A1 * | 1/2007 | Kaakani ............. G06F 12/0269 711/159 |
| 2007/0162526 A1 | 7/2007 | Printezis et al. |
| 2010/0153675 A1 | 6/2010 | Kumar |

(Continued)

OTHER PUBLICATIONS

Kalibera, et al., "Scheduling Hard Real-time Garbage Collection", In Proceedings of 30th IEEE Real-Time Systems Symposium, Dec. 1, 2009, pp. 81-92.

(Continued)

*Primary Examiner* — Khanh Pham
(74) *Attorney, Agent, or Firm* — Workman Nydegger (57) ABSTRACT

Controlling garbage collection operations. The method includes setting up garbage collection to collect objects that are no longer in use in a managed code environment. The method further includes receiving managed code input specifying a desired quantum within which it is desired that garbage collection not be performed. The method further includes performing a computing operation to determine the desired quantum can likely be met. The method further includes running memory operations within the quantum without running the initialized garbage collection.

20 Claims, 2 Drawing Sheets

(56) References Cited

U.S. PATENT DOCUMENTS

2011/0119318 A1* 5/2011 Daynes .............. G06F 12/0276
707/816
2012/0102289 A1* 4/2012 Maram .............. G06F 12/0253
711/170
2012/0290628 A1 11/2012 Johnson

OTHER PUBLICATIONS

Bollella, et al., "Programming with Non-Heap Memory in the Real Time Specification for Java", In Proceedings of the ACM SIGPLAN Conference on Object-Oriented Programming Systems, Languages and Applications, Oct. 26, 2003, 9 pages.
"International Search Report and Written Opinion issued in PCT Patent Application No. PCT/US2016/017428", Mailed Date: Apr. 26, 2016, 13 pages.
Second Written Opinion issued in PCT Application No. PCT/US2016/017428, mailed Feb. 7, 2017.
Oracle "Oracle JRockit Performance Tuning Guide Release R28" Dec. 1, 2011.
LUA "LUA Garbage Collection", Sep. 27, 2017.
"International Preliminary Report on Patentability Issued in PCT Application No. PCT/US2016/017428", dated May 26, 2017, 7 Pages.

* cited by examiner

GARBAGE COLLECTION CONTROL IN MANAGED CODE

BACKGROUND

Background and Relevant Art

Computers and computing systems have affected nearly every aspect of modern. Computers are generally involved in work, recreation, healthcare, transportation, entertainment, household management, etc.

Some computer programs are written using so called managed code. Managed code is computer program source code that requires and will execute only under the managed code may execute under the .NET Framework available from Microsoft Corporation of Redmond, Wash.

Managed code typically has various tools and management features to assist in developing applications. In particular, the CLR will handle many code management functions to prevent conflicts such as variable conflicts or memory conflicts. By using managed code and compiling in a managed execution environment, developers can avoid many typical programming mistakes that lead to security holes and unstable applications. Also, many unproductive programming tasks are automatically taken care of such as type safety checking, memory management, and destruction of unneeded objects. Developers can therefore focus on the business logic of applications and write them using fewer lines of code.

In managed code environments, a process known as garbage collection is a form of automatic memory management that can be used to destroy unneeded objects. The garbage collector (GC) attempts to reclaim memory occupied by objects that are no longer in use by any programs. During garbage collection, process threads will be suspended for all or part of the garbage collection as the objects no longer in use are discarded and the memory containing them reclaimed for other objects.

However, certain performance sensitive applications may wish to operate without interference from the GC. For example, some users have indicated that they are unwilling for their user threads to be suspended for over 1 ms. For example, in the market trading industry, even very short interruptions can prevent a trade from taking place resulting in a loss. However, 1 ms may be woefully insufficient to perform garbage collection on a memory heap that may well be several GB in size.

Previously, users have been advised to pre-allocate, in memory, all of the objects they anticipate using during a process to prevent garbage collection operations from being performed. However, this may be impractical. In particular, one advantage of managed code is productivity. If developers need to spend a lot of time pre-allocating anticipated memory objects, they might think using managed code is giving them diminished returns. Additionally, if developers do not anticipate and thus pre-allocate an object, then when the object is allocated during runtime, garbage collection may be triggered. In fact, allocation of object is typically what triggers a garbage collection operation. Further still, some libraries may not allow the user to pre-allocate objects.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a managed code computing environment which implements garbage collection. The method includes acts for controlling garbage collection operations. The method includes setting up garbage collection to collect objects that are no longer in use in a managed code environment. The method further includes receiving managed code input specifying a desired quantum within which it is desired that garbage collection not be performed. The method further includes performing a computing operation to determine the desired quantum can likely be met. The method further includes running memory operations within the quantum without running the initialized garbage collection.

Another embodiment includes, in a computing environment, a computer readable storage device. The computer readable storage device includes computer executable instructions that when executed by one or more processors causes a managed code application programming interface (API) for controlling garbage collection to be implemented. The API includes a first set of one or more fields that allows a user to specify an amount of memory to be pre-committed for later object allocation. The first set of one or more fields allows the user to specify a total memory size to commit, a memory size to commit for a small object heap and a memory size to commit for a large object heap such that at least the total memory size is committed between the combination of the large object heap and the small object heap. The API further includes a second set of one or more fields that allows a user to specify whether or not to block garbage collection prior to pre-committing the amount of memory.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may implement functionality, for managed code applications, to prevent (or at least attempt to prevent) garbage collection from occurring for some user specified quantum. Thus, for example, a user may specify that garbage collection should not occur for some given period of time. Embodiments can perform certain operations to determine if garbage collection can be suspended for the period of time specified. Such operations may include, for example, determining that sufficient free memory likely exists in the memory to suspend garbage collection, pre-committing portions of the memory to meet the user specified quantum, and/or simply turning off garbage collection for the specified period of time. In other embodiments, the user may specify a quantum of memory that it would like to use without interruption from garbage collection. Again, in response, the system can perform operations such as determining that sufficient free memory likely exists in the memory to suspend garbage collection, pre-committing portions of the memory to meet the user specified quantum, and/or simply turning off garbage collection for the specified amount of memory accesses.

This functionality can be used to improve system performance during performance critical times. The overall performance of the system can be measurably better by preventing resource intensive garbage collection operations from being performed.

Figure 1:
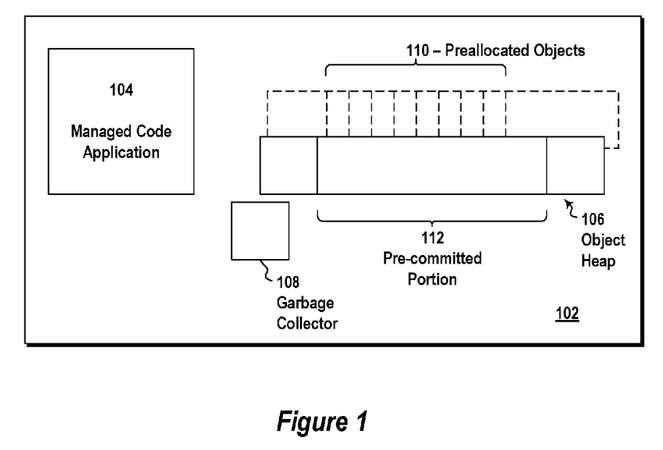
FIG. 1 illustrates a system implemented in a managed code environment which includes a garbage collector and is configured to pre-commit memory to prevent garbage collection from occurring.

Referring now to FIG. 1, a system 102 is illustrated. The system 102 includes a managed code application 104. The managed code application 104 is an application that runs using a managed code platform. For example, the managed code application 104 may be written using one of a number of different high-level programming languages that are available for use with the .NET Framework, including, languages such as C#, J#, Microsoft Visual Basic .NET, Microsoft JScript .NET, and managed C++. The languages share a unified set of class libraries and can be encoded into an Intermediate Language (IL). A runtime-aware compiler compiles the IL into native executable code within a managed execution environment that ensures type safety, array bound and index checking, exception handling, and garbage collection.

FIG. 1 further illustrates an object heap 106. The object heap 106 comprises memory, such as system RAM, virtual memory that uses system memory, or other memory that can be used to store objects. The object heap 106 includes a number of segments. Segments may be assigned by the operating system of the system 102 for storing managed objects. A segment is a portion of the object heap 106 that has been allocated by an operating system to store objects in memory spaces for code (such as the managed code application) running in the operating system environment. A number of objects may be stored in the segments.

An object may include additional portions that vary from object to object. For example, an object may include a header that includes information about the object including such information as class type, size, etc. The object may include references to other objects 106. Additionally, an object may include data members. Data members may include raw low level data, such as integers, Booleans, floating point numbers, characters, or strings.

FIG. 1 further illustrates a garbage collector (GC) 108. The GC can walk the heap 106 to identify objects that are no longer needed such that memory used for those objects can be recovered. When a managed code operating environment is initiated, a GC is typically initiated with the managed code operating environment to perform garbage collection activities.

As noted, it may be desirable that garbage collection be suspended or not run during some period of time to prevent suspension of user threads. However, the conventional wisdom is the garbage collection should never be suspended. Therefore, various embodiments described herein may implement functionality that attempts to prevent garbage collection from being performed during some quantum specified by a user.

FIG. 1 illustrates, in phantom, previously implemented measures that developers themselves might attempt to prevent garbage collection operations from being performed. In particular, FIG. 1 illustrates a set 110 of specific objects that may have been pre-allocated in the heap 106. However, this required the developer to know beforehand the objects would need to be allocated in order to allocate them, and if the developer were mistaken and new objects needed to be allocated, then garbage collection activities may have been performed contravening the user's wishes. Additionally, this may make programming more complex and tedious.

Figure 2:
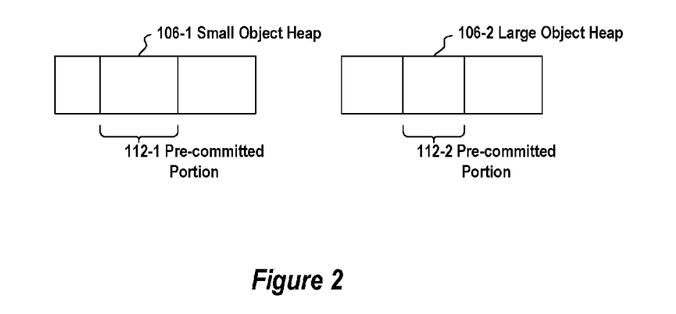
FIG. 2 illustrates a small object heap and a large object heap each having pre-committed portions.

In contrast, embodiments herein may allow a developer to pre-commit a portion 112 of the heap 106. In particular, the developer may pre-commit a portion 112 of the heap 106 sized to prevent garbage collection activities from being performed along with, optionally, some factor of safety to try to ensure that garbage collection activities will not be initiated. For example, assume that a developer knows that approximately 500 MB of memory will be needed for object allocation during execution of a managed code application (such as the objects in the set 110). The developer could pre-commit a 700 MB portion 112 in the heap 106 to provide a factor of safety. However, in other embodiments, the system 102 may only allocate the 500 MB requested by the user. The user can be responsible for requesting additional pre-committed memory amounts. Then, the application could allocate space in the pre-committed portion 112 for objects as needed. So long as the application does not need to allocate more than 700 MB to objects, the system can guarantee that garbage collection activities will not be performed. While the above illustrates a heap 106 generally, it should be appreciated that the heap 106 will often be divided into a large object heap (LOH) and a small object heap (SOH) such as is illustrated in FIG. 2 where the small object heap 106-1 and the large object heap 106-2 are shown. As used herein, the small object heap is simply a heap used for other objects that are not maintained in the large object heap. Thus small objects are just other objects, such as those that are not large enough to be classified as large objects.

Embodiments may include functionality for allowing for pre-committing memory on either or both of the LOH and the SOH. Additionally, embodiments may include functionality that allows full blocking garbage collection operations to be performed. Full blocking garbage collection is a non-concurrent collection that collects the whole heap. It is a form of garbage collection that will get rid of all possible garbage in the managed heap. In a generational garbage collection, full blocking garbage collection is used because sometimes garbage collection is not performed on the whole heap. In some systems the garbage collection operations are not generational which means all garbage collection operations are performed on all of the heap. Embodiments may wish for garbage collection to reclaim as much memory as possible, to increase the chance of having enough memory to pre-commit what the user is asking for before a "no garbage collection region" starts. In cases where a user chooses to do a full blocking garbage collection operations, some embodiments may allow a minimal amount of garbage collection to be performed to create space in memory prior to pre-committing space. For example, in some embodiments, a minimal garbage collection operation can be performed on a SOH to allocate a new segment for the SOH. This may provide a sufficient amount of memory in the SOH to perform the pre-commitment. In some embodiments, the segment size can be adjusted to ensure that sufficient memory is available for the pre-commitment. However, if sufficient memory is not available, even after a minimal garbage collection operation as described herein, embodiments may simply return an indication that the memory cannot be pre-committed.

The following illustrates application programming interface (API) details that may be used to implement this functionality. When implementing an API for pre-committing portions of the heap, there are several factors that may be considered. Such factors may include the size of the pre-committed portion, where the pre-committed portion should be committed (e.g. LOH, SOH, or both), and whether or not full blocking garbage collection operations should be performed or not.

Embodiments may include an API that allows a developer to specify a total size of a pre-committed portion. The following illustrates an example API call:
public staticbool TryStartNoGCRegion(long totalSize);

In this example, totalSize is what the developer expects to allocate without triggering any garbage collection. Note that this size includes all allocations that occur during this period, i.e., it includes allocations the framework makes on the user's behalf. To the GC there is no difference between framework allocations and end user code allocations.

It is common that garbage collectors distinguish between large objects and other smaller objects. Large objects are specially handled. If that's the case APIs can give users a choice for specifying allocations on the large object heap and the small object heap. The following are APIs examples to commit the beginning of the region where garbage collection is not performed:
public staticbool TryStartNoGCRegion(long totalSize, long lohSize);

In this example, a developer can indicate a total commitment how many bytes out of the total will be LOH commitments. The system can ensure that there are that many bytes pre-committed for the LOH and the rest are committed for the SOH. In the example above, the developer does this by specifying the LOH pre-commit bytes in lohSize above.

In some embodiments, if lohSize is not specified, embodiments could implement a conservative approach and would commit (2*totalSize) total, by committing totalSize for SOH allocations as well as totalSize for LOH allocations to ensure a sufficient amount of memory In some embodiments, the default behavior is to do a full blocking GC to obtain more memory if there is not enough memory available to commit the desired amount of memory. However if the developer does not want the interruption of a full blocking garbage collection, given that such operations may take significant amounts of time, the developer can specify the a full blocking garbage collection operation should not be allowed. Consider the following two example API invocations:

public staticbool TryStartNoGCRegion(long totalSize, bool disallowFullBlockingGC);
public staticbool TryStartNoGCRegion(long totalSize, long lohSize, bool disallowFullBlockingGC);

In these examples by specifying a true for disallowFullBlockingGC, a full blocking GC operation will not be performed. Instead, embodiments can attempt to commit the requested memory without using a GC blocking operation or by using a minimally blocking GC operation if more memory is needed. This can be useful, for example, for load balancing scenarios where one machine (e.g. the system 102 when implemented among a plurality of such systems) can opportunistically call this API and report itself as ready to accept requests if the API returns success indicating that the requested commit has been performed without needing to perform a full blocking GC operation. Alternatively, a machine could have a load balancer redirect requests to other machines if the API does not return success. In this case, the machine could do a full blocking GC on its own while it is not handling requests.

As alluded to above, embodiments may allow for the API to provide one or more return values. In the illustrated example, the following represent some possible return values that may be returned by the API:

true—this return value indicates that the system was successful at committing the required amount memory and users will not get interrupted by GCs if they allocate object using an amount less than or equal to the amount they specified false—this return value indicates that there was not enough memory to commit the specified amount of memory.

ArgumentOutOfRangeException—this return value indicates that the system cannot allow users to ask for more than one segment size worth of memory for the SOH.

InvalidOperationException—this return value indicates that the process is already in this mode, i.e., someone has already called StartNoGCRegion. Note that in the illustrated example, this call cannot be nested.

Embodiments of the API may further include functionality for ending the mode where no garbage collection is performed. For example, the API may allow the following call (or similar call) to cause garbage collection to resume as originally initialized for the environment:
public static void ENdNoGCRegion( );

The API may allow for various exceptions. The following illustrate a sample of exceptions that may be provided and illustrated herein as InvalidOperationException—This exception may be triggered if the no GC region mode was not in effect (e.g., in the illustrated example, if StartNoGCRegion was not called or was unsuccessful). Alternatively or additionally, this exception may be triggered when garbage collection operations are induced before EndNoGCRegion was called which ended the no garbage collection region mode. Alternatively or additionally, this exception may be triggered when the amount of memory allocated to objects exceeds the amount specified when calling the API.

Now illustrating one example use case of the API, a user can test their scenarios to figure out how much memory to allocate during a performance critical path. When they are about to get into that path, they call a start API to start a "No GC region" with the number of bytes they need to allocate. When they are done, they call an end API to end this region. During this region garbage collection operations will not happen if the user does not exceed the amount of allocations they specified.

The following discussion now refers to a number of methods and method acts that may be performed. Although the method acts may be discussed in a certain order or illustrated in a flow chart as occurring in particular order, no particular ordering is required unless specifically stated, or required because an act is dependent on another act being completed prior to the act being performed.

Figure 3:
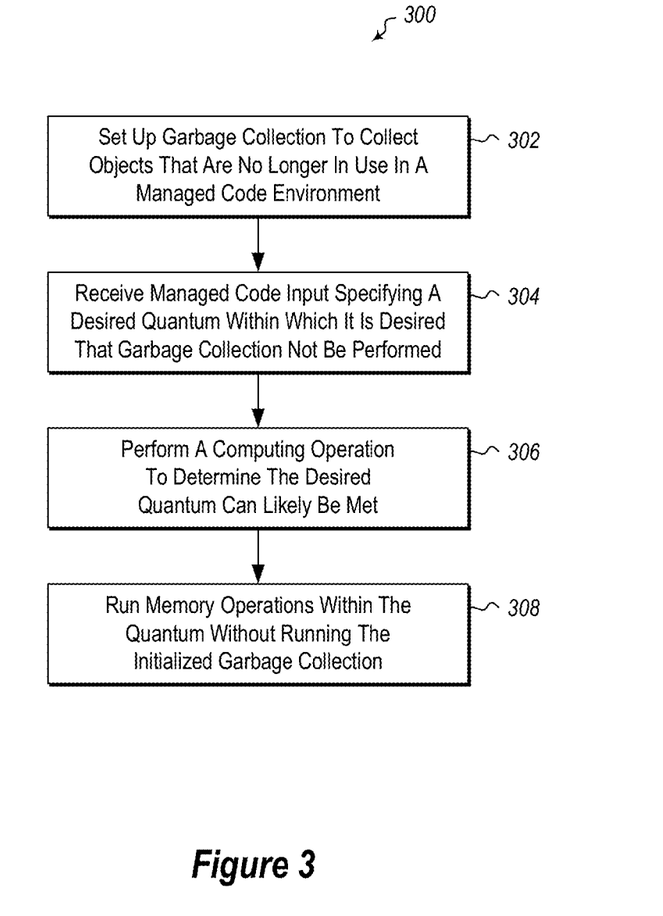
FIG. 3 illustrates a method of controlling garbage collection operations.

Referring now to FIG. 3, a method 300 is illustrated. The method may be practiced in a managed code computing environment which implements garbage collection. The method 300 includes acts for controlling garbage collection operations.

The method 300 includes setting up garbage collection to collect objects that are no longer in use in a managed code environment (act 300). For example, FIG. 1 illustrates a garbage collector 108. The garbage collector 108 may be included in a system 102 due to the fact that the system 102 runs managed code applications such as the managed code application 104. Thus, the system 102 may be configured to perform garbage collection activities by virtue of having a garbage collector set-up and initialized to function on the system 102. Without further intervention, the garbage collector 108 will attempt to reclaim memory in the heap 106 as needed, such as for example, when an object allocation is attempted and more memory space is needed in the heap 106 to satisfy the attempted allocation.

The method 300 further includes receiving managed code input specifying a desired quantum within which it is desired that garbage collection not be performed (act 304). As illustrated, previously herein, this may be accomplished in a number of different fashions. For example, in some embodiments, an amount of memory to be pre-committed may be specified. In an alternative environment, the user can specify an amount of time for which the user wishes for garbage collection activities to not be performed. In this case, the system can attempt to commit an amount of memory which should be sufficient to allocate objects in the period of time specified by the user. This can be based on historical, statistical, heuristic, etc. analysis based on the types of operations anticipated to be performed by the system. Note that the different embodiments have different levels of surety. For example, when memory is pre-committed, the system can guarantee that so long as objects are not allocated beyond the pre-commitment, that garbage collection will not occur. In contrast, when embodiments are just making a guess based on heuristics, it is not a guarantee.

The method 300 may further include performing a computing operation to determine the desired quantum can likely be met (act 306). For example, this may include analyzing available memory and determining that the quantum can likely be met without performing garbage collection operations. Alternatively or additionally this may include the system committing a determined amount of memory to ensure the ability to run operations without garbage collection operations being performed. If a user specifies a quantum of memory allocations that should be run without running garbage collection operations, embodiments can pre-commit an amount of memory and can therefore guarantee that no garbage collection operations will so long as object allocations remain below the specified amount of memory.

The method 300 further includes running memory operations within the quantum without running the initialized garbage collection.

The method 300 may be practiced where the computing operation comprises completely disabling the set up garbage collection. Thus for example, the garbage collector 108 in the system 102 may be completely disabled such that garbage collection will not occur no matter what happens in the memory heap 106. While this may result in errors in the memory heap 106, embodiments may nonetheless allow such functionality to be implemented.

The method 300 may further include receiving input specifying that garbage collection can run, and as a result performing garbage collection operations per the set up garbage collection. Thus for example, in some embodiments the garbage collector 108 may be re-enabled if it has been disabled. Alternatively, the garbage collector 108 may run because the user specified quantum has been met.

As noted above, the method 300 may be practiced where the operation to determine the desired quantum can likely be met comprises performing heuristic analysis on a memory to determine based on past operations on the memory that the desired quantum can likely be met. Thus for example, embodiments may analyze historically what has occurred when instances of a managed application are run and determine if the quantum can likely be met based on that history.

The method 300 may be practiced where the operation to determine the desired quantum can likely be met comprises committing one or more memory regions, for later object allocation, to meet the desired quantum. For example, the API described previously herein may be used to commit a portion of the heap 106 that is the size of the quantum. Various alternatives will be illustrated below.

Thus, the method 300 may be practiced where the input specifies a memory size to commit. In some such examples of this embodiment, the method 300 may further include, based on the input, committing at least the memory size specified in a large object heap and at least the memory size specified in a small object heap. Thus, at least double the amount of the memory size specified in the input is committed between the combination of the large object heap and the small object heap. This is illustrated in FIG. 2. FIG. 2 illustrates the heap 106. The heap 106 includes a small object heap 106-1 and a large object heap 106-2. Since only a total memory size is specified in the user input, the system 102 does not know if the memory should be committed in the large object heap or the small object heap. Thus, the system may commit a portion 112-1 in the small object 106-1 heap and a portion 112-2 in the large object heap 106-2.

In a alternative embodiment, the input specifies information that can be used to identify a total memory size to commit, a memory size to commit for a small object heap and a memory size to commit for a large object heap. In the API example above, this is done by specifying a total size to commit in memory (and in particular in the heap) and size to commit in the large object heap, from which the size to commit in the small object heap can be calculated by simple subtraction. However, various alternatives could be used. For example, embodiments could allow a user to specify the total size to commit in memory and the size to commit in the small object heap. In yet another alternative, embodiments could allow a user to specify the size to commit in the large object heap and the size to commit in the small object heap. In any case, the input specifying information that can be used to identify a total memory size to commit, a memory size to commit for a small object heap and a memory size to commit for large object heap is performed such that at least the total memory size is committed between the combination of the large object heap and the small object heap as specified in the information in the input.

In some embodiments of the method 300, the method may be practiced where the input specifies that full blocking garbage collection should be disabled when committing the memory size specified. This can be done for very time sensitive applications which it is desired that the expensive operation of performing a full garbage collection operation should not be performed.

In some such embodiments where input is received that specifies that full blocking garbage collection should be disabled when committing the memory size specified, the method 300 may further include determining that there is enough memory space available to commit the memory size specified without running any garbage collection prior to committing the space, and as a result, committing at least the memory size specified in memory.

Alternatively, in such embodiments where input is received that specifies that full blocking garbage collection should be disabled when committing the memory size specified, the method 300 may determine that there is not enough space to commit the memory size specified without running any garbage collection; as a result, performing a minimum blocking garbage collection to acquire a contiguous region of memory in a small object heap; determine that the contiguous region of memory is sufficient to commit the memory size specified; and as a result, commit at least the memory size specified. In an alternative example, systems may perform a young generation collection to collecting part of the heap. Various other alternatives may be implemented in alternative or additional embodiments.

The method 300 may determine that there is not enough memory space to commit the specified memory size, and as a result, return an indicator indicating that memory was not committed. This can be performed in various alternatives. For example, in some embodiments, this may be performed will full blocking disabled and without attempting a minimum garbage collection. Alternatively this may occur after performing a blocking or minimum garbage collection and determining that there is still insufficient memory to commit the requested size.

In some embodiments of the method 300, the method of claim 6, further comprising, returning an indicator indicating that the specified memory size was committed in memory. For example, as illustrated above, a true value is returned from calling the API when the amount of memory specified by the user is able to be committed.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or othr electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a genera purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a managed code computing environment which implements garbage collection, a system for controlling garbage collection operations, the system comprising:
   one or more processors; and
   one or more computer-readable media, wherein the one or more computer-readable media comprise computer-executable instructions that when executed by at least one of the one or more processors cause the system to perform the following:
   initializing garbage collection to collect objects that are no longer in use for a particular managed code in a managed code environment;
   receiving managed code including receiving managed code input specifying a desired quantum within which it is desired that no garbage collection will be performed in order to at least increase the performance of the managed code within the desired quantum;
   performing a computing operation to determine the desired quantum can likely be met, the computing operation including at least evaluating an anticipated resource usage rate of the managed code within the desired quantum; and
   based at least on determining the desired quantum can be met, running memory operations within the quantum without running the initialized garbage collection.

2. The system of claim 1, wherein the computing operation to determine the desired quantum can likely be met comprises disabling the initialization of garbage collection.

3. The system of claim 1, wherein the one or more computer-readable media comprise computer-executable instructions that when executed by at least one of the one or more processors cause the system to perform the following:
   receiving input specifying that garbage collection can run, and as a result performing garbage collection operations per the initialized garbage collection.

4. The system of claim 1, wherein the operation to determine the desired quantum can likely be met comprises performing heuristic analysis on a memory to determine based on past operations on the memory for the particular managed code that the desired quantum can likely be met.

5. The system of claim 1, wherein the operation to determine the desired quantum can likely be met comprises committing one or more memory regions, for later object allocation, to meet the desired quantum.

6. The system of claim 1, wherein the input specifies a memory size to commit.

7. The system of claim 6, wherein the system is a system where objects are separated based on their sizes where larger objects are handled in their own heap, and wherein the one or more computer-readable media comprise computer-executable instructions that when executed by at least one of the one or more processors cause the system to perform the following:
   based on the input, committing at least the memory size specified in a large object heap and at least the memory size specified in a small object heap, such that at least double the amount of the memory size specified in the input is committed between the combination of the large object heap and the small object heap.

8. The system of claim 6, wherein the input specifies information that can be used to identify a total memory size to commit, a memory size to commit for a small object heap and a memory size to commit for a large object heap such that at least the total memory size is committed between the combination of the large object heap and the small object heap as specified in the information in the input.

9. The system of claim 6, wherein the input specifies that full blocking garbage collection should be disabled when committing the memory size specified.

10. The system of 9, wherein the one or more computer-readable media comprise computer-executable instructions that when executed by at least one of the one or more processors cause the system to perform the following:
    determining that there is enough memory space available to commit the memory size specified without running any garbage collection prior to committing the space, and as a result, committing at least the memory size specified in memory.

11. The system of 9, wherein the one or more computer-readable media comprise computer-executable instructions that when executed by at least one of the one or more processors cause the system to perform the following:
    determining that there is not enough space to commit the memory size specified without running any garbage collection;
    as a result, performing a minimum blocking garbage collection to acquire a contiguous region of memory in a small object heap, wherein the minimum blocking garbage collection allocates a new segment for a small object heap;
    determining that the contiguous region of memory is sufficient to commit the memory size specified; and
    as a result, committing at least the memory size specified.

12. The system of claim 6, wherein the one or more computer-readable media comprise computer-executable instructions that when executed by at least one of the one or more processors cause the system to perform the following:
    determining that there is not enough memory space to commit the specified memory size, and as a result, returning an indicator indicating that memory was not committed.

13. The system of claim 6, wherein the one or more computer-readable media comprise computer-executable instructions that when executed by at least one of the one or more processors cause the system to perform the following:
    returning an indicator indicating that the specified memory size was committed in memory.

14. In a computing environment, a computer readable storage device comprising:
    computer executable instructions that when executed by one or more processors causes a computer system to perform the following:
    initializing, at the computer system, garbage collection to collect objects that are no longer in use for a particular managed code in a managed code environment;

receive, at the computer system, managed code including receiving managed code input specifying a desired quantum within which it is desired that no garbage collection will be performed in order to at least increase the performance of the managed code within the desired quantum;

perform, at the computer system, a computing operation to determine the desired quantum can likely be met, the computing operation including at least evaluating an anticipated resource usage rate of the managed code within the desired quantum; and based at least on determining the desired quantum can be met, run, at the computer system, memory operations within the quantum without running the initialized garbage collection.

15. In a managed code computing environment which implements garbage collection, a method of controlling garbage collection operations, the method comprising:

initializing garbage collection to collect objects that are no longer in use for a particular managed code in a managed code environment;

receiving managed code including receiving managed code input specifying a desired quantum within which it is desired that garbage collection not be performed in order to at least increase the performance of the managed code within the desired quantum;

performing a computing operation to determine the desired quantum can likely be met, the computing operation including at least evaluating an anticipated resource usage rate of the managed code within the desired quantum; and based at least on determining the desired quantum can be met, running memory operations within the quantum without running the initialized garbage collection.

16. The method of claim 15, wherein the operation to determine the desired quantum can likely be met comprises committing one or more memory regions, for later object allocation, to meet the desired quantum.

17. The method of claim 15, wherein the input specifies a memory size to commit.

18. The method of claim 17, further comprising, based on the input, committing at least the memory size specified in a large object heap and at least the memory size specified in a small object heap, such that at least double the amount of the memory size specified in the input is committed between the combination of the large object heap and the small object heap.

19. The method of claim 17, wherein the input specifies information that can be used to identify a total memory size to commit, a memory size to commit for a small object heap and a memory size to commit for a large object heap such that at least the total memory size is committed between the combination of the large object heap and the small object heap as specified in the information in the input.

20. The method of claim 17, wherein the input specifies that full blocking garbage collection should be disabled when committing the memory size specified.

* * * * *